United States Patent [19]

Marti

[11] Patent Number: 4,681,209

[45] Date of Patent: Jul. 21, 1987

[54] MACHINE FOR POSITIONING CONTAINERS

[76] Inventor: Jaime S. Marti, Emancipacion #8,10,1A, Barcelona, Spain

[21] Appl. No.: 598,416

[22] Filed: Apr. 9, 1984

[30] Foreign Application Priority Data

Apr. 8, 1983 [ES] Spain .................................. 52.1347

[51] Int. Cl.$^4$ ............................................ B65G 47/24
[52] U.S. Cl. ................................... 198/392; 198/397; 198/464.4; 198/473.1; 198/493
[58] Field of Search .............. 198/380, 392, 397, 440, 198/443, 453, 400, 473.1, 803.11, 464.4, 493; 221/163, 167, 169, 168, 233; 222/305, 328; 209/522, 523, 530, 625, 628, 684, 644, 380

[56] References Cited

U.S. PATENT DOCUMENTS

| | | | |
|---|---|---|---|
| 2,343,496 | 3/1944 | Carroll | 221/233 X |
| 2,972,410 | 2/1961 | Schulte et al. | 209/644 |
| 3,295,659 | 1/1967 | Aidlin | 221/169 X |
| 3,650,368 | 3/1972 | Nalbach | 198/397 |
| 3,870,194 | 3/1975 | Taylor | 221/167 X |
| 4,130,194 | 12/1978 | Schindel et al. | 198/397 |

FOREIGN PATENT DOCUMENTS

| | | |
|---|---|---|
| 85388/75 | 1/1979 | Australia . |
| 459/10031 | 6/1966 | Fed. Rep. of Germany . |
| 2042547 | 8/1970 | Fed. Rep. of Germany . |
| 1558379 | 12/1979 | United Kingdom ................ 198/392 |

Primary Examiner—Robert B. Reeves
Assistant Examiner—Edward M. Wacyra
Attorney, Agent, or Firm—Holman & Stern

[57] ABSTRACT

A machine for positioning containers such as plastics bottles has an upper, larger disc (11) and a lower, smaller disc (12) which rotate together about an axis inclined to the vertical in order to transfer containers from a lower level to a higher level. During this transfer the containers are positioned in peripheral recesses in the disc (11). Below each peripheral recess, a chute or passageway (20) extends from the disc (11) to the disc (12), and a fixed annular plate (14) projects between the recesses and the passageways (20) to prevent containers falling into the passageways (20) except at the higher level where there is a discontinuity on the plate (14). The recesses for receiving the containers circling the periphery of the disc (11) are formed by detachable parts (16) which can be interchanged with replacement parts (16) to suit the particular shape of the containers being handled. Also, the passageways (20) are detachably mounted around the peripheries of the discs (11) and (12) and are interchangeale with replacement passageways (20) to suit the shape of the containers being handled.

9 Claims, 15 Drawing Figures

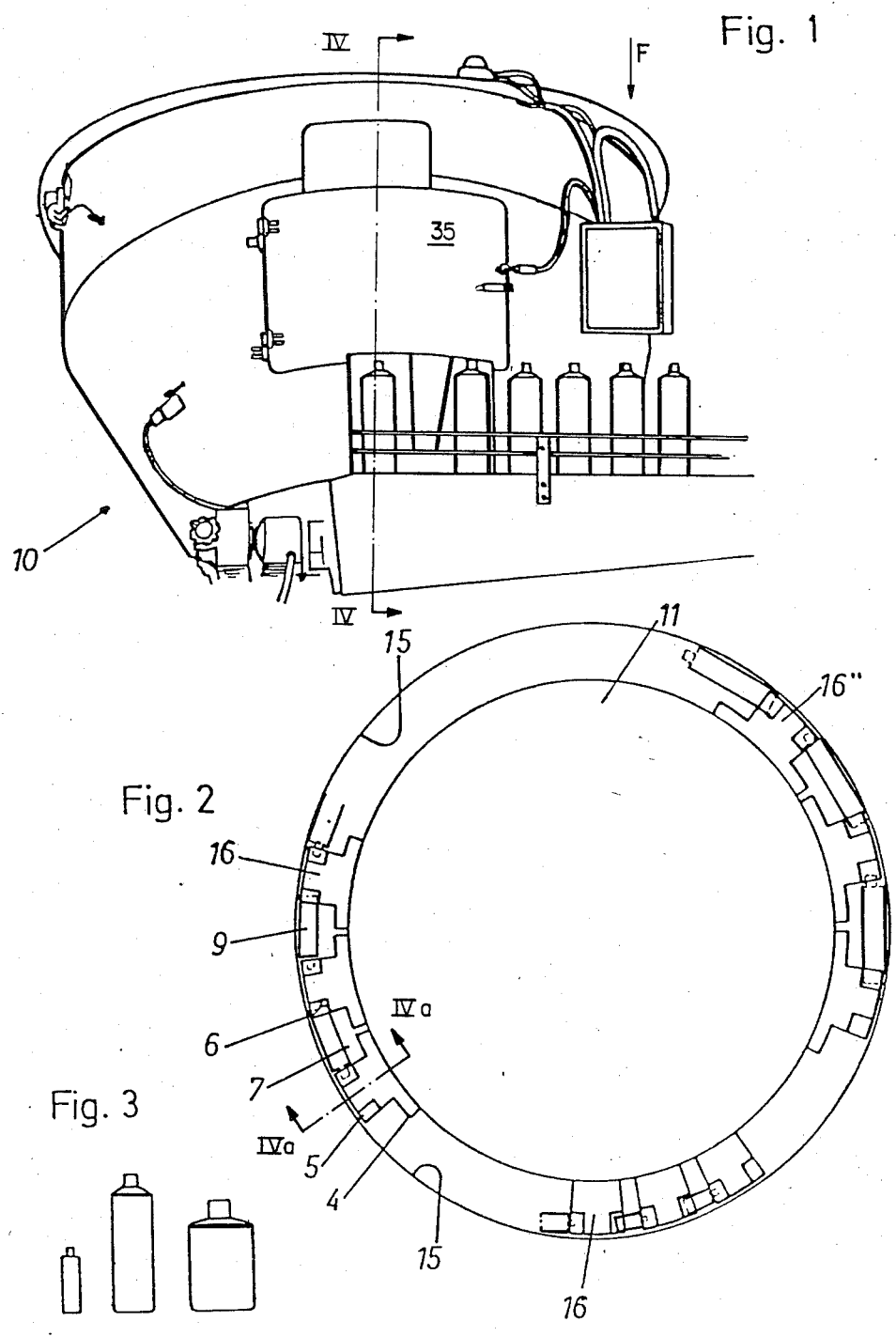

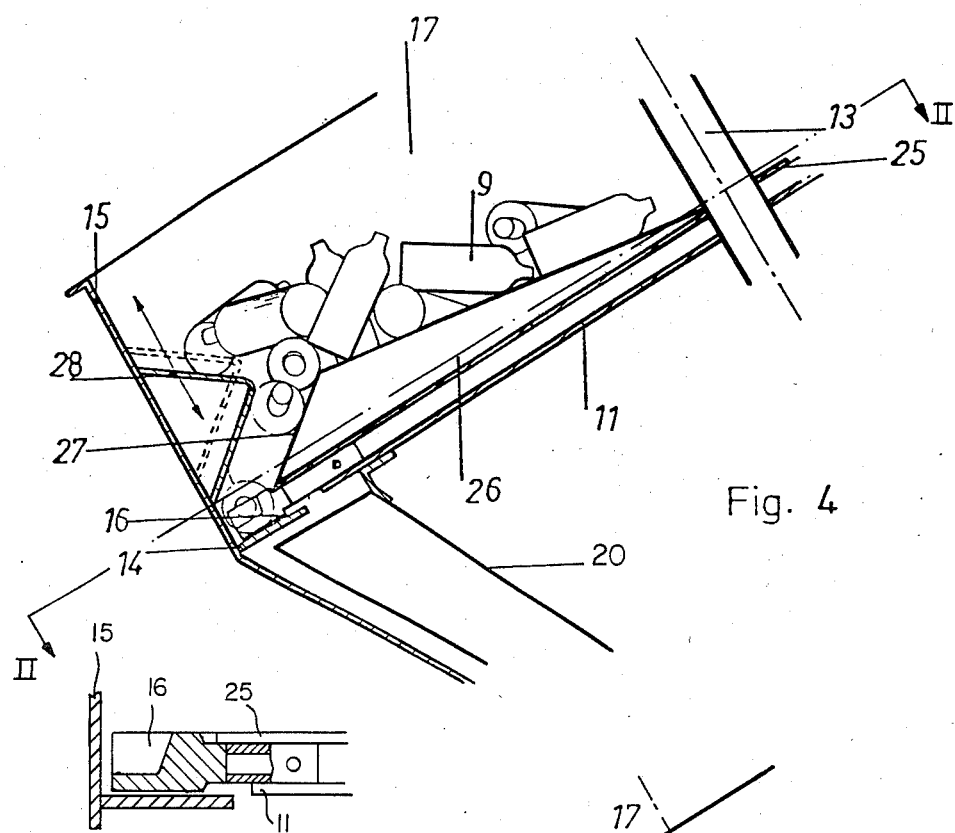
Fig. 4
Fig. 4a
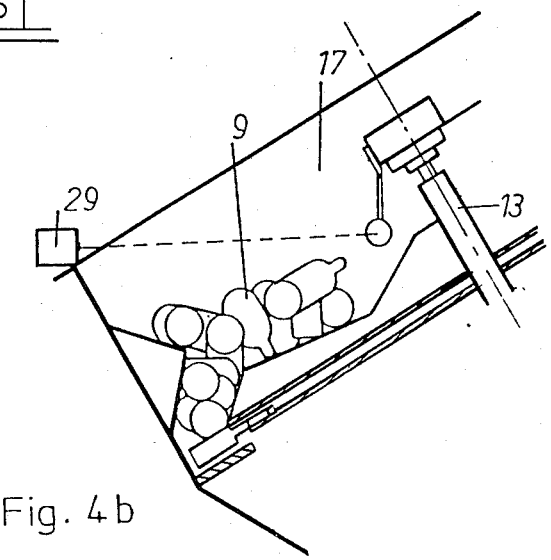
Fig. 4b

Fig. 7
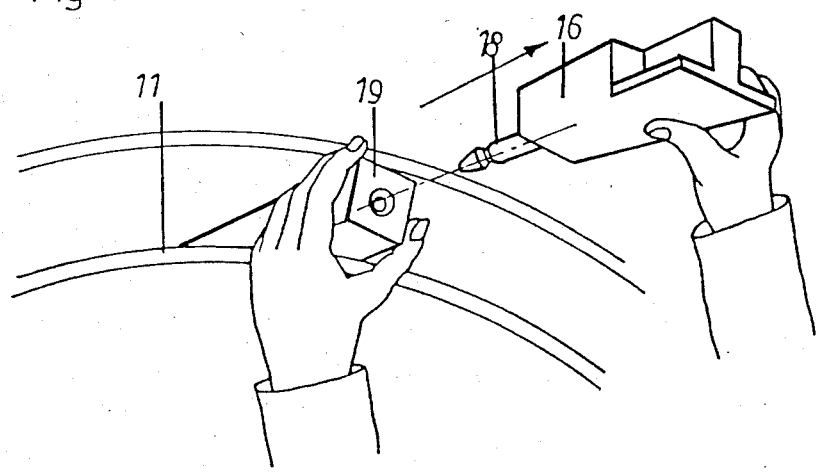
Fig. 8
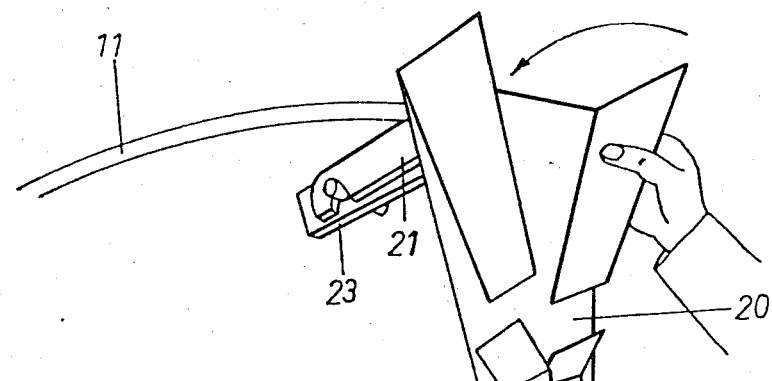
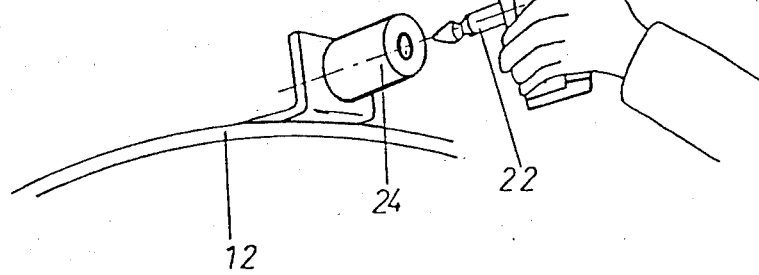

MACHINE FOR POSITIONING CONTAINERS

BACKGROUND OF THE INVENTION

1. Field of the Invention

This invention relates to a machine intended for the automatic positioning of containers which may be of very different formats and sizes, with the ability to change its rate of production by unit of time within very wide margins (for example, to work with containers of ½ l, 1 l, or 1½ l capacity, selectively). This machine is designed for continuous feeding of other machines, such as high production filling machines, and is able to carry out this function owing to the large number of containers which it can position correctly per unit of time. Containers are fed by means of a horizontal transport belt toward the utilization line. Another factor in its high production rate is a minimum of interruptions occurring in its work cycle owing to its design and the means of control which are provided, while it is also possible for special purposes to operate two or more of these machines in parallel with the two production lines in this case joining to form a single line which is used to feed the corresponding filling machine.

It is understandable that in a machine of these characteristics the main parameter is reliable operation on which total production directly depends, because of which this automatic cycle machine is equipped with control and/or safety components designed to immediately detect any irregularity in the state of the containers (imperfect finish, irregular shape, etc.), or in their positioning, in the means of container transfer within the machine, in which case where defective they must immediately be rejected and removed from the other containers in such a way that they do not at any time interrupt the functioning of the machine, as described hereafter.

2. Description of the Prior Art

To this effect, this machine sets out from the basic structure of a machine of which the main function has already been described in U.S. Pat. No. 3,650,368 to John R. Nalbach although the machine therein described has undergone a radical modification, having in common with the unit now proposed only a similar system of container transfer.

BRIEF SUMMARY OF THE INVENTION

In this new machine important innovations have been introduced, out of which comes an original design of cages where containers accumulate just as they are tipped, within a loading cavity which the machine incorporates for their transfer and of an essential form which makes it possible to modify, in a minimum of time, the dimensions and shape of those receptacles which can be adapted in a very precise way to the special conditions of each type of container to be handled, which guarantees a minimum of interruptions, which is also helped by the transfer with selective pre-orientation toward such cavities, thereby minimizing dead time, which cavities can be changed within a very wide range making it possible also to increase the number of cages and to change to another rhythm of production, all this being accomplished by simply changing a number of parts which can be done very easily by a non-specialist operator in a short space of time.

The machine envisaged therefore is of the type which consists of a charge hopper or grid substantially of round configuration formed by an upper cylindrical section having a central axis, coaxial with the axial direction of symmetry of the unit, which has an inclination of approximately 30 degrees; two parallel discs of different diameters, working in conjunction with and coaxial to two different levels, turn around the axis, with the larger disc located almost level with the bottom of the cylindrical cavity, and are designed to retain containers which tend to accumulate, given the inclination of the cavity, at the lowest level, lining up in generatrix orientation between the discs; and in conjunction with these a series of tubular sections define the respective gravity feeds for the containers which are closed at the lower end by the bottom level of the grid which offers a side exit opening with passages at a level below the periphery of the larger disc, the edge of which remains at a certain distance from the cylindrical wall to permit the containers to be accomodated between the edge and the lateral surface; and also involving a stationery plane or shelf adjacent to the upper moving disc which operates in conjunction with the gravity feeds to retain the containers on the outside or in the passageways of these feeds along a pre-established angle of rotation, except in a preselected position, in the highest part of the larger rotating plane.

Relating the proposed machine to the abovementioned U.S. Patent we find a difference in that the formative plane of the bottom of the cavity is not fixed but moving, and it also incorporates a series of carriers placed along a conical-stem surface, applied to the discharge of containers in a vertical position, housing them during transfer between the edge of a moving disc and the mouths of the stated carriers, allowing them to fall only when no support is offered by the fixed plane as happens in that early patent, but that support is given distinctive configuration as in the access of the containers to the carriers and in the cages themselves which adopt a form completely different and original, according to the description set out below.

In this way therefore this machine is characterized by the fact that incorporated along a peripheral surface band of the upper disc, the edge of which lies at a greater distance from the lateral wall than preconceived in the construction of the abovementioned patent, and distributed at equidistant points, is a series of radially oriented female connectors able to accept by snap-in coupling an equivalent number of parts, all the same and, this being an advantage, metal parts of very varied configuration which can be cast, provided with a male coupling terminal and bevels or blocks for support and stability over the periphery of the disc, in certain cases formed by wings which extend over the edge of the disc limiting the width of the housing, of which the parts extend radially as appendages toward the wall of the cavity, remaining at minimum distance from it and above the fixed container retention plane, in general offering an area according to a central prismatoid portion of trapezoidal isosceles section; each part has at the base of at least one of its sides (the back in respect to the forward direction of the disc), a number of projecting plates or fins, of variable configuration which define the seating, selectively complemented with support projections connecting with the outer edges or necks of the containers, or with part of their lateral section, in such a way that these parts together with the perimeter of the disc between the wall of the hopper and the retainer plane form a series of holders of common size which are variable in width, length and form when the side of the cavity and its two extremes is made up of the section of above-mentioned rechangeable pieces, allowing the retention of containers in these cages in a reclining position with the containers supported on the side or lateral wall above the static retaining plane which limits its access to the different passages and which are stopped by a conventional structure in the supper section of the hopper where the emptying passageways adopt a vertical orientation, now allowing containers to fall onto a second retaining plane of minimum longitudinal surface and allowing them to fall from this point finally to the bottom of the grid where they are evacuated by a tangential outlet, according to a conventional system, now moving by conveyor belt.

Another peculiarity of the invention herein described is the fact that the carriers for the discharge of the containers in vertical position also are changeable there being in each case a number of these equivalent to that of the carriers defined by the parts which make up from the edge of the upper disc the earlier mentioned transfer cages. The said carriers make use of a tubular shape, with one of the sides missing which is provided by the side wall of surrounding conical stem section which they face, equipped at their extremes with an appendage or perpendicular arm which comes out of its interior wall, prepared for a configuration of engagement, and in its upper part a rapid snap-in male element for coupling onto a locking mechanism, set out equidistant in the two earlier mentioned parallel discs, in their lower and upper planes and made up of a suspension element and by a female snap-in member, respectively, which make it removeable.

Specifically, the machine being described, at different equidistant points on the periphery of the moving disc, incorporates two or more series of female snap-in members, for installation on the earlier mentioned discs, and a variable number of related sets of appendages of a range of lateral size and width in its support sides, extending beyond the edge of the disc, which may be heterogeneous, and also equipped, in points aligned with the distance of each of the said sets of appendages and over the two discs, with locking units of the type mentioned earlier for coupling a greater or lesser number of discharge ways, in such a way that it can be modified at will both in the form and dimensions of the container holding cages, equipped in this case in one of the said series of groups of female connectors with different appendages as well as in the number of the said cavities, in which case it is necessary to use another series of female connectors with a greater or lesser number of elements, as well as substitute the container feed tubes for a greater or lesser number of containers, attaching them at other locking points, distributed for the purpose at equidistant points over the periphery of the two discs, as explained earlier.

In this way the machine includes attachments and, to allow it to be used by a specific manufacturer, a series of appendages and feed tubes, the first designed expressly having in mind characteristics of shape, size and diameter or section of containers to be handled, given which the carriers placed around the periphery of the disc have characteristics conceived especially for those containers and likewise two or more sets of container feed tubes of different range and number of elements per set, in case the need arises not only for a change between two containers of similar size and different form but also a change from a large format to another much smaller, for example a half or a third of the first or vice versa.

All this gives the machine a great versatility, a machine conceived, on the basis of a single structure, to look after multiple needs in the handling of different containers making it likewise possible to make the operation of this machine compatible with the new designs of containers which constantly are appearing on the market, to take into account their handling to the point of redesigning the radial appendages (or in some additional cases a dummy) to define the transfer cavities of the said containers toward their drop point, should the lateral or lower support plane fail and as this drop is always vertical should the neck of the container catch on an extending plane which stops it from falling, according to the conventional techniques well resolved in general lines in the proceedings related in principle.

It should also be emphasized that in order to improve the glide condition of containers over the bottom plane of the cavity, this is made up of a disc-shaped plate manufactured from a material of very low coefficient of friction, linked to the larger moving disc which is located just above its surface, and practically superimposed as a lining.

Another characteristic of the machine envisaged is the fact that the extreme part of the vibrator or agitator device for accumulated containers which occupies the lowest level terminates in the shape of an inclined plane, of negative slope, which facing the said ramp is a triangular profile attached to the cylindrical wall of the said hopper, of a shape corresponding to an arc covering the side of the said lower section which can be regulated for height along a generatrix in such a way that between the end of the vibrator device and the lower side of the said profile, with substantially common inclines, that is to say each defining parallel planes, there is a pass or passageway of sufficient amplitude for the size or section of the containers (with a simple position regulation of the earlier mentioned profile), in order to avoid accumulations above the transfer cavities in such a way that containers can only enter the cavities in a flat position and avoiding other types of spring-type detection devices or blowers used up until now to remove containers which whether or not properly seated in the carriers were dragged along by the disc during its rotation, systems which either used to damage containers or involved an additional energy cost in any case and a drop in output of the unit.

It should also be pointed out that at the same time the total accumulation of containers is limited by a photoelectric sensor system which interrupts loading when it exceeds a predetermined level above the lowest zone or section of the cavity, reinitiating the load when the volume of containers accomodated diminishes, which results in less pressure on those containers which occupy the lower part thereby avoiding deformation (common in containers made of plastics in conventional devices), all of which means a better utilization of containers and a higher operational performance of the unit.

With the aim of preventing a container with irregularities in its structure (of poor finish in its manufacture) from dropping while it remains held between two of the said appendages, attached to the highest of the bottom of the cavity where the maintenance level of containers is interrupted, a detector device is located to detect such anomalies and to expel such a container toward a location outside the chamber where it is collected or where it is rejected to the exterior. In this way, each of the parts or appendages which are attached to the upper moving disc presents a transversal channel at its extreme end intended to allow the passage of a swinging finger shaped detection element located with its top section interposed on the stroke in advance of the said elements on the area described right after the normal point of drop for the containers, in such a way that if a container for any reason does not fall, as soon as the support plane is interrupted the section of the said container lifts the detector arm generating an electrical command which activates a blower thereby removing the defective container which goes to a gathering box attached located above the circular container support plane.

Another particular characteristic of the unit herein described lies in the fact that it incorporates, as has been stated, an access door to the side for the two previously mentioned discs to allow changes of appendages or of these and the container drop feeds, there being attached to this door a plane in the form of a shelf of curvilinear shape similar to the plane of the door forming part of the earlier mentioned retaining plane which is placed transversally to the container drop tubes in such a way that these are maintained above the said shelf from the drop zone and when the said drop tubes are advanced a turn, the containers then fall by gravity to a second determined level at the bottom of the frame, from which path they are removed through a lateral outlet onto the previously mentioned conveyor belt.

The conical stem section of the cavity has a wall with an optimum generatrix inclination of 45 degrees, given that if it is more inclined it will accomodate a lower volume and if it is less inclined the containers near the wall in the zone of the drop tubes do not slide sufficiently which can have a negative effect on proper functioning.

The level of containers housed in the hopper is a parameter which can be varied and can be determined by experiment depending on the form, dimensions and weight of the containers being handled and once the level is set it must be controlled by the system described (level barrier by optical sensor) independent of the real section of the work cavity.

BRIEF DESCRIPTION ON THE DRAWINGS

For a better understanding of the characteristics of this invention the invention will now be described in detail with reference to the accompanying drawings, wherein:

FIG. 1 is a perspective view of the machine showing the access door to the interior which permits the replacement of changeable parts as explained hereinbefore;

FIG. 2 is a schematic top plan view of the machine of FIG. 1 (without the lining disc of low friction coefficient) showing three different types of radial appendages locked onto the periphery which provide three different container holding cavities, with the shape of the containers shown partially in dotted line;

FIG. 3 shows a side view of three different containers which can be handled by the machine simply by changes in radial appendages. For simplicity, these containers are shown in cylindrical form but it should be pointed out that they may have any other configuration given that it is always possible to design appendageparts to be added to those indicated in such a way that between their sides and periphery and the cylindrical wall there is a cavity which faithfully corresponds to that particular section;

FIG. 4 shows a partial cross-sectional view taken generally alone line IV—IV of FIG. 1 of that portion of the machine cavity which lies at the lowest level expressly indicating the vibrator element, of the profile for preorientating of containers, and of the fixed plane which supports the containers, except in one sector defined in the upper level where the plane is interrupted and now made up of a shelf attached to the wall of the cavity. Also shown in this view is one of the radial appendages and the corresponding container passageway, both removable in accordance with what has been explained earlier;

FIG. 4a is a cross-sectional view taken along line IVa13 IVa of FIG. 2 showing a detail of the fixed container support shelf where it is attached to the central part of the structure above which is located the moving disc which carries the appendages (not shown) with a second movable plane below for attaching the container passageways.

Figure 5:
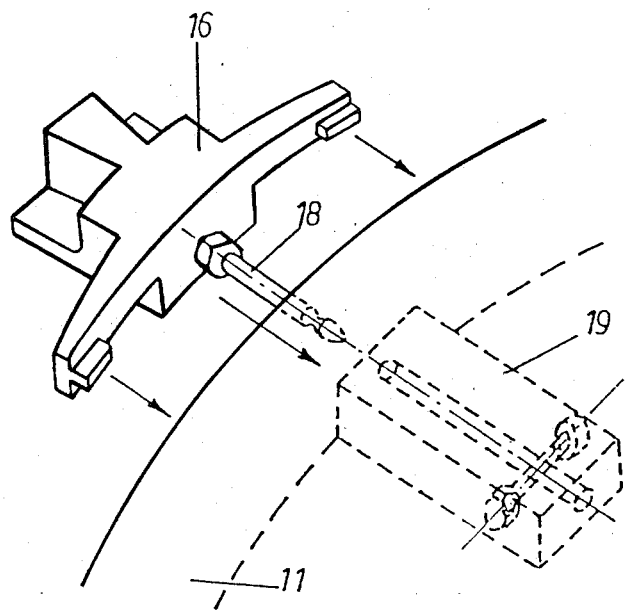
Figure 6:
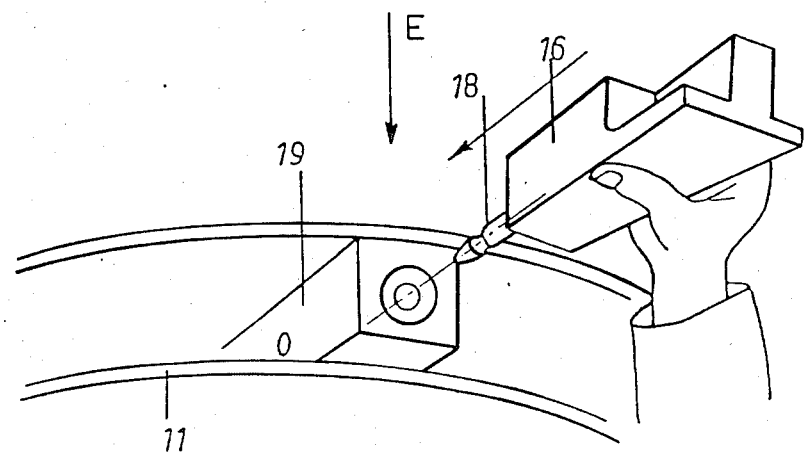

FIG. 4b is a schematic cross-sectional view showing the device for limiting the level of container load on the lower section of the cavity in order to avoid excessive accumulation of containers in this area;

FIG. 5 shows in perspective in the direction of arrow E of FIG. 6 the structural characteristics and the method of joining one of the parts which are attached to the upper moving disc as radial appendages, the appendage being inserted in a female snap-in part which is also shown;

FIG. 6 also shows in perspective the moment when an operator proceeds to insert one of the said parts in the upper disc;

FIG. 7 is similar to FIG. 6 showing the instant in which one of the said pieces which defines the lateral cavities for holding containers is removed from its mounting on the upper disc;

FIG. 8 shows in perspective both the structure and method of mounting one of the passageways for containers centered in respect to the holding cavities defined in the periphery of the upper moving disc.

Figure 9:
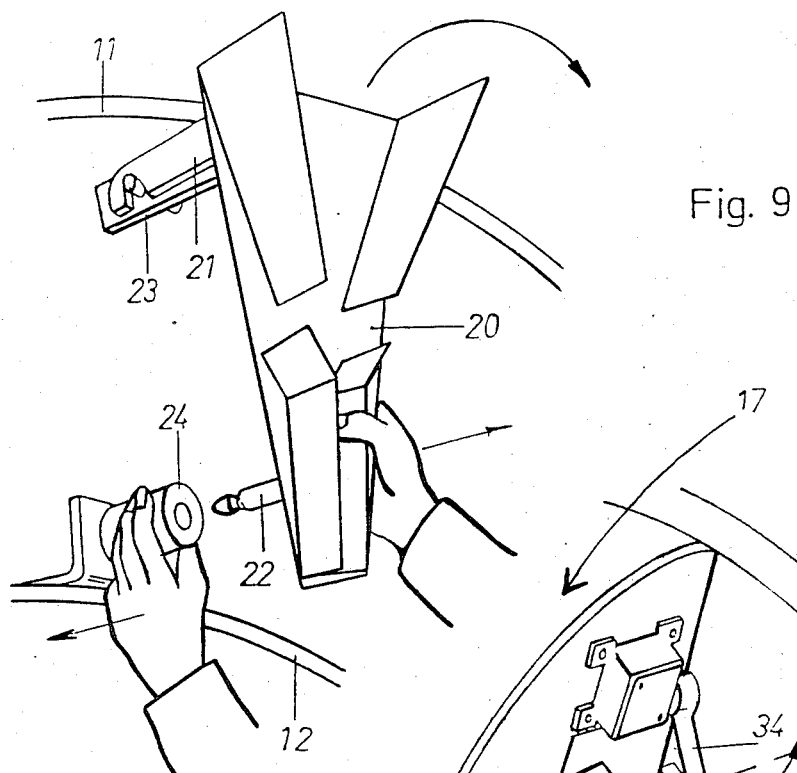
Figure 10:
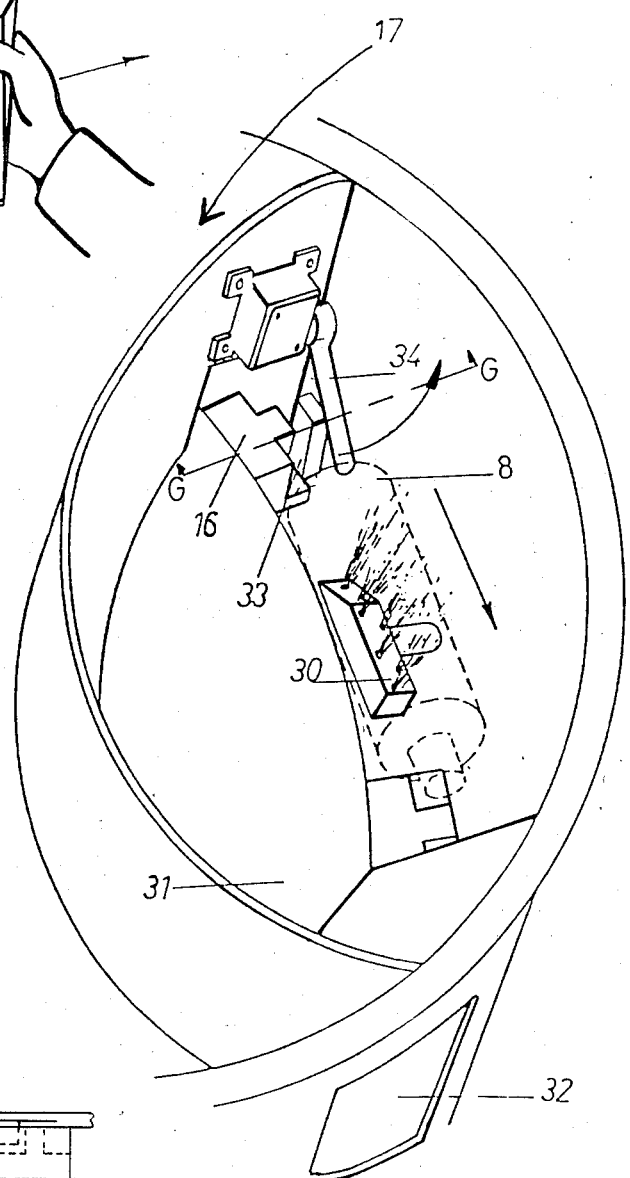
Figure 11:
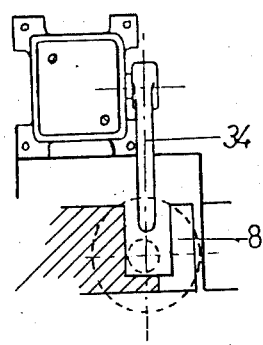
Figure 11B:
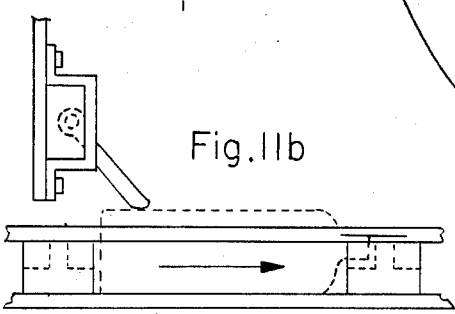

FIG. 9 is similar to FIG. 8 showing the operation of removal of one of the said lower passageways in order to change parts;

FIG. 10 shows in perspective a detail view taken generally in the direction of arrow F of FIG. 1 of the defective container removal device for containers which do not drop when the support plane misses as well as recovery or removal cavity for such containers as earlier described;

FIG. 11a shows a detail when viewed generally in the direction of arrow G of FIG. 10 of the action of the finger-shaped detector which activates the operation of the blower shown in the previous drawing;

FIG. 11b is a left side elevational view of FIG. 11a; and

Figure 12:
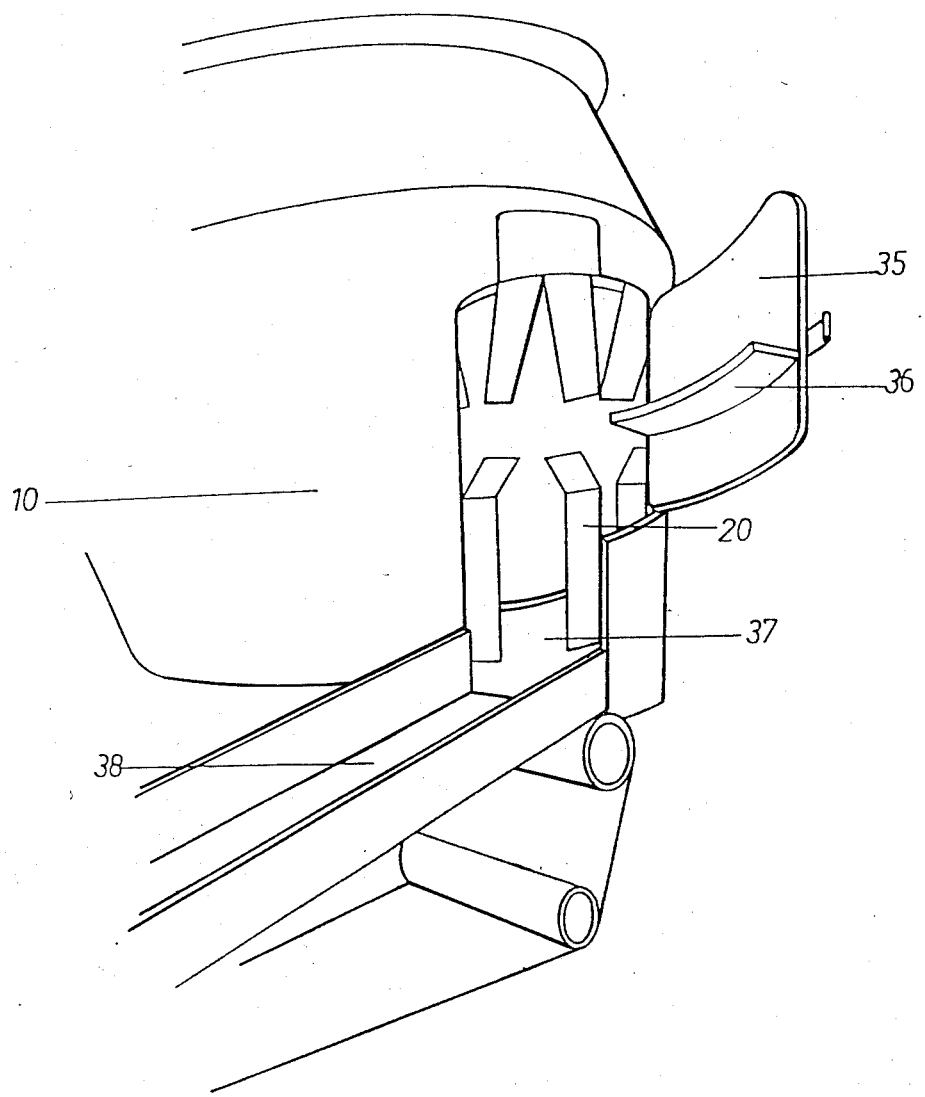

FIG. 12 shows in perspective the side door of the hopper with the door open.

DETAILED DESCRIPTION

In accord with the foregoing, the unit envisaged is made up of a hopper -10-, with a cylindrical loading section or cavity and a lower conical stem-shaped section in which are located a pair of parallel discs -11- and -12- which turn on the unit's axis of symmetry -13- inclined to the vertical, and a fixed plane or shelf -14- which is continuous along the entire periphery of the larger disc -11-, except in one section of predetermined length and location.

The upper moving disc -11-, stands at an appreciable distance from the wall -15- of the cavity and carries, supported on the shelf 14, a series of parts -16-, of different characteristics, which extend radially and which define between their sides and periphery and the wall -15- of the cavity a series of spaces designed to accept containers -9- in a lying position, which containers have been tipped into the cylindrical cavity -17- of the unit -10- which positioning is made possible by the inclined orientation of the axis -13- of the cavity at approximately 30 degrees from the vertical, as can be clearly seen in FIG. 4 of the attached drawings.

The said parts -16- are joined to the disc -11- by inserting an extreme axial section -18- which they incorporate into female sections -19- which are located in equidistant series on the disc plane -11-.

Located between the two discs -11- and -12- are a series of passageways -20-, each oriented in the manner of a generatrix, which have on their inside face an appendage -21- with a configuration of a catch at one end and an axial member -22- at the other for attaching onto a holding element -23- located on the inside face of the disc -11- and insertion in a snap-in female block -24- located above the lower disc -12-. Both elements -23- and -24- are located in equidistant series along the periphery of the two discs -11- and -12- taking on an arrangement similar to that shown in FIG. 8.

Above disc -11- and very close to it is a second disc -25- made of material of very low coefficient of friction making up the bottom of the cavity -17- which facilitates the sliding of the containers and their accumulation in the lower section of the load space, as shown in FIGS. 4 and 4b.

Above plane -25- in the zone corresponding to the lower section a vibrator device -26- is located designed to provide better flow of containers -9- toward the peripheral cavities, activated by a conventional system of which the end portion is shown as an inclined plane -27-.

Directly opposite the end -27- of the vibrator device -26- and attached to the side -15- of the cavity a triangular profile -28- is located, designed so that it can be regulated in height for positioning in an axial direction along the said wall -15- with the inclination of its sides sybstantially equivalent to that of the end -27- of the vibrator -26- in such a way that between both planes a passage is defined which equals, with a small tolerance, the width of the containers, all of which determines that containers can reach the interior of the cavity only in a lying state and singly, which improves the performance of the unit avoiding jams and the use of methods for preventing containers being retained together in a cavity which already holds a container.

Also as shown in FIG. 4b, an optical barrier device -29- is used to limit the maximum level of container -9- accumulation over the lowest level of the cavity -17- a parameter which will vary according to each job and which makes possible better handling of containers -9- by the unit, avoiding deformation of containers which can affect their structure and the conditions of their later transfer.

The removal of containers -8- which because of deficiencies in manufacture have projections which prevent them from dropping when the shelf -14- intervenes, takes place by means of a blower -30- which removes them to a cavity -31- alongside and situated above the bottom of the cavity -17- where such containers -8- are collected or are removed through an opening -32-. To this effect, the parts -16- have been designed with a deep groove -33- near its extreme section so that a finger-form sensor -34- can turn freely across it and which is interposed with the advance of such parts -16-, only in the case where a container has been retained between two of the described appendages -16- which causes the tripping of the sensor -34- which is swing-mounted and which activates the blower which removes such a container -8- to the location -31- previously described.

FIG. 12 shows that the unit -10- incorporates a door -35- which provides direct access to the interior of the space allowing access to the periphery of the two discs -11- and -12- where the appendages -16- and the passageways -20- are located which facilitates their mounting or eventual removal in a very simple way by means of operations which have been shown in FIGS. 6, 7, 8 and 9. The said door -35- also incorporates a shelf -36- which is situated, when closed, between the passageways -20- which have a part of their sides cut out to allow such location in such a way that the containers on falling into vertical position are supported first on that shelf -36- finally falling after passing over it to the bottom level of the hopper from which, after passing through a circumferential circuit end up coming out by the exit -37- and moving onto the conveyor belt -38-.

The use of shelf -36- was foreseen in the U.S. Pat. No. 3,650,368 cited above, although, given the innovative structure now proposed, it has been necessary to provide a new positioning for it, finally placing it on the door -35- given the simplicity which this involves.

With special attention to FIG. 2, this shows that the holding cavities -7- for containers -9- are defined between the sides -6- of the parts -16- on at least one of which are located fins -5-, the periphery -4-, and the cylindrical wall -15- so that the said cavities -7- can be defined in such a way that they correspond adequately to the form and general dimensions of the containers whatever these may be.

It is also even possible to add to the sides -6-, or to the periphery -4- of the parts -16-, gaining access thereto by means of the door -35- dummy parts which permit the form of the said cavities -7- to accommodate a special type of container -9-, which differs little from the basic format, all of which in any case means a greater versatility of the unit and a higher operating performance which are its essential attributes.

The described machine therefore has an upper, larger disc 11 and a lower, smaller disc 12 which rotate together about an axis inclined to the vertical in order to transfer containers from a lower level to a higher level. During this transfer the containers are positioned in peripheral recesses in the disc 11. Below each peripheral recess, a chute or passageway 20 extends from the disc 11 to the disc 12, and a fixed part-annular plate 14 projects between the recesses and the passageways 20 to prevent containers falling into the passageways 20 except on the higher level where there is a discontinuity on the plate 14. The recesses for receiving the containers circling the periphery of the disc 11 are formed by detachable parts 16 which can be interchanged with replacement parts 16 to suit the particular shape of the containers being handled. Also, the passageways 20 are detachably mounted around the peripheries of the discs 11 and 12 and are interchangeable with replacement passageways 20 to suit the shape of the containers being handled.

I claim:

1. A machine for orienting containers such as plastic bottles, the machine comprising:
   a hopper;
   a first disc in said hopper;
   means to rotatably mount said disc for rotation about an axis inclined to the vertical;
   means for feeding containers onto the disc;
   a plurality of detachable container holding elements removably mounted at the periphery of the disc and defining peripheral recesses between said elements for receiving individual containers and moving said containers from a low level to a high level upon rotation of the first disc;
   a plurality of passageway means extending downwardly below said first disc, each passageway means being aligned below one of said corresponding peripheral recesses and having a configuration to receive and orientate containers falling into said passageway means into an upright position;
   means for preventing containers from falling into said passageway means, except at a drop zone at a higher level of the disc for allowing containers to fall into said passageway means at said higher level;
   means for receiving the uprightly orientated containers from the lower ends of the passageway means;
   means to detachably connect said holding elements to said disc so that said holding elements can be interchanged with other holding elements; and
   means for detachably mounting said passageway means around the periphery of said first disc to facilitate interchangeability thereof with other passageway means to enable the machine to handle containers of different shapes and sizes.

2. A machine as claimed in claim 1 wherein: a second disc is disposed below said first disc and connected thereto for rotation therewith about the inclined axis; and each passageway means extends between said two discs and has formations which are detachably engageable with the two discs.

3. A machine as claimed in claim 2 wherein:
   said means for preventing containers from falling into the passageway means except at the drop zone at the higher level of the disc comprises a stationary part-annular plate extending between said recesses and passageway means, and having a discontinuity at said higher level through which said container can pass.

4. A machine for orienting containers as claimed in claim 3 wherein: said passageway means comprises plate members connected together to form a substantially three-sided channel; said hopper has a lower conical section a portion of which forms a fourth side of said channel; said means for detachably mounting said passageway means comprises an arm extending from one of said plate members adjacent the upper end thereof; cooperating engageable means on the outer end of said arm and on said first disc; a pin connector element extending from said one of said plate members adjacent the lower end thereof; and a female snap-in connector on said second disc for releasably engaging said pin connector element.

5. A machine for orienting containers according to claim 4 wherein:
   said means for mounting said passageway means further comprises a plurality of series of female snap-in members for installation on said second disc;
   said passageway means further comprises a plurality of related sets of plate members of a range of lateral size and width extending beyond the edges of said discs;
   a plurality of said engageable means are provided at points on said first disc aligned with each set of plate members for a plurality of passageway means, so that the machine can be modified both in the form and dimensions of the container holding elements and the passageway means; and
   the hopper is provided with a side access door means adjacent said passageway means through which said passageway means and holding elements are movable during changing thereof.

6. A machine according to claim 1, wherein above said first disc is positioned a disc-shaped receiving plate made of a material having a low coefficient of friction to facilitate sliding movement of the containers towards the lower level.

7. A machine according to claim 1, wherein above said first disc is provided means defining a channel of adjustable width, and for guiding the containers into said channel in a lying position and from the channel into the recesses in a lying position.

8. A machine for orienting containers according to claim 1 and further comprising:
   each of said holding elements mounted on the upper movable disc comprises a central body portion and cut-out portion forming a channel extending transversely to said central body portion;
   a sensor having a finger-shaped detector member located within the path of movement of said channel portion of said holding elements in the upper part of the machine adjacent to and after the drop zone in the direction of rotation of said first disc for sensing a defective container remaining in the recesses after passing the drop zone; and
   a blower means positioned after said passageway means in said direction of rotation so that a container that does not drop from said recesses through said passageway means raises the finger-shaped detector member thereby generating an electrical signal which activates said blower which blows and effects the removal of the defective container to a gathering cavity situated adjacent to and above said first disc.

9. A machine for orienting containers according to claim 1 and further comprising: a side access opening in said hopper adjacent said passageway means; a door over said opening; a retainer shelf in said door extending substantially parallel to said disc for supporting the containers as they move over said door opening; and an exit opening in said hopper immediately to a second level on the bottom of the frame from where adjacent said door through which the containers move out from the machine.

* * * * *